United States Patent Office 3,341,465
Patented Sept. 12, 1967

3,341,465
NOVEL GEL EMULSIONS
Thomas G. Kaufman, Boonton, N.J., and Richard J. Tkaczuk, Stamford, Conn., assignors to Drew Chemical Corporation, New York, N.Y., a corporation of Delaware
No Drawing. Filed Jan. 14, 1965, Ser. No. 425,633
11 Claims. (Cl. 252—316)

This invention relates to novel gel emulsions. More particularly, this invention relates to novel clear, transparent oil-in-water gel emulsions.

In recent years, there has developed a very great interest in clear oil-in-water gels useful for cosmetic purposes. This apparent interest is largely due to the strong consumer appeal of these clear gels. Among the various types of clear gels are transparent emulsions containing from 20–30% mineral or hydrocarbon oil, 15–30% surfactants and the remainder water. Such mineral oil-in-water gel emusions are generally used as hair grooming preparations and possess several advantages. However, such preparations possess certain inherent disadvantages due to the use of mineral oil, among them being low emolliency, greasiness and inferior softness.

While such hydrocarbon or mineral oil-in-water gels offer certain advantages, the use of such oil does offer certain limitations with respect to emolliency or greasiness and softness to the skin. Such factors are very desirous and of prime importance to the cosmetic chemist in preparing cosmetics of the clear gel type. Furthermore, clear gel formulations involving mineral oil may become difficult to prepare since the use of a mineral oil of slightly different viscosity may not yield a transparent product.

It has been discovered that clear gels may be prepared which offer superior characteristics to the aforesaid types of gels. Such superior characteristics are manifested in their tendency to impart greater emolliency while appearing to show less greasiness as well as offering a greater softness and elegance to the skin which makes them very appealing and suitable to the individual.

Broadly stated, the clear oil-in-water gel emulsions of the present invention comprise water, an ester of a lower monohydric alcohol and a fatty acid, and a combination of surfactants.

More specifically, the clear transparent gel emulsions of the present invention comprise water, an ester of a lower monohydric alcohol and a fatty acid, a higher fatty acid alkylolamide, polyoxyethylene ethers of higher aliphatic alcohols, and/or polyoxyethylene esters of higher fatty acids, and a compound selected from the group consisting of esters of polyhydric alcohols, such esters having at least one free hydroxyl group and at least one esterified fatty acid group.

If desired, supplemental ingredients can be added the the compositions of the present invention so long as the amounts or character of such supplemental ingredients are not such as to adversely affect the desired properties of said compositions. Thus, for example, various cosmetic or pharmaceutical adjuvants such as humectants, bactericides such as hexachlorophene, and additional hair conditioning agents can be added in relatively minor amounts.

The ester of a lower monohydric alcohol and a fatty acid employed in the present invention can be represented by the following generic formula:

$$R_1-\overset{O}{\underset{\|}{C}}-O-R_2$$

wherein $R_1$ is a residue of a fatty acid and contains from about 8 to 24 carbon atoms and preferably from about 11 to 17 carbon atoms; and $R_2$ is a residue of a lower alkyl monohydric alcohol having from about 1 to about 4 carbon atoms. The preferred esters are made from isopropyl alcohol. Illustrative of such esters are isopropyl myristate, isopropyl palmitate, and isopropyl laurate. Mixtures of two or more of such esters may be employed. The lower alcohol ester is desirable for the formation of the gel structure and contributes substantially to the clarity, emolliency, softness and elegance of the final clear gel product.

The higher fatty acid alkylolamide employed in this invention can be represented by the following generic formula:

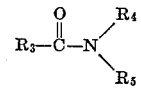

wherein $R_3$ is a residue of a fatty acid and contains from about 8 to 14 carbon atoms and preferably from about 9 to 13 carbon atoms; $R_4$ is selected from the group consisting of hydrogen and a lower alkyl monohydric radical having from 1 to about 4 carbon atoms; and $R_5$ is a lower alkyl monohydric radical having from 1 to about 4 carbon atoms. Illustrative of such alkylolamides are lauric diethanolamide, capric diethanolamide, myristic diethanolamide, lauric-myristic diethanolamide, coconut fatty acid diethanolamide, lauric monoethanolamide, etc. Mixtures of two or more of such alkylolamide compounds may be employed. The alkylolamide contributes to the formation of the structure and the clarity of the gel.

The polyoxyethylene ethers of higher aliphatic alcohols and the polyoxyethylene esters of higher fatty acids referred to jointly herein as polyoxyethylene surfactants are known non-ionic surfactants. The ethers may be represented by the generic formula:

$$R_6-O-(C_2H_4O)_nH$$

and the esters by the generic formula:

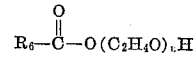

where, in each formula, $R_6$ is an aliphatic radical containing from about 8 to 24 carbon atoms and preferably from 12 to 18 carbon atoms; and $n$ represents the number of oxyethylene units in the molecule. The aliphatic radical may either be saturated or unsaturated and may be derived from a natural or synthetic fatty acid or a natural alcohol or a synthetic alcohol, such as an oxo-type aliphatic alcohol. It is preferred to use a mixture of polyoxyethylene ethers or esters, such as that of oleyl alcohol or lauryl alcohol or stearic acid, wherein the member of oxyethylene units of the polyoxyethylene chain varies from 2 to about 30 or 40 for each member of the polyoxyethylene surfactant mixture and has an average value based on the weight of the ethers and/or esters employed of about 10 to about 18 oxyethylene units. The average number of oxyethylene units is derived by multiplying the weight and number of oxyethylene units for each polyoxyethylene compound, summing the multiplication products, and then dividing by the total weight of such compounds. The polyoxyethylene surfactant is a highly desirable constituent of the clear gel composition and its elimination substantially diminishes the clarity of the gel. Illustrative of the ether polyoxyethylene surfactants are the polyoxyethylene ethers of oxo-type decyl alcohol, lauryl alcohol, oxo-type dodecyl alcohol, myristyl alcohol, and the like, and of the esters, polyoxyethylene laurate, palmitate, stearate and oleate.

The polyhydric alcohol surfactants referred to herein are the higher fatty acid esters of polyglycerols, sugars, and glycerol and polyoxyalkylene derivatives thereof, and have at least one free hydroxyl group and at least one esterified fatty acid group, and may have one or more ether linkages per molecule. Particularly preferred are the polyglycerol (ether) partial esters of higher fatty acids. The preparation of such polyglycerol esters are described in co-pending application Ser. No. 363,755 filed Apr. 29, 1964. Illustrative of these polyglycerol esters are hexaglycerol dioleate, decaglycerol tetraoleate, triglycerol mono-oleate, and the like. The utilization of the polyhydric alcohol surfactant, particularly a polyglycerol partial ester, allows the employment of lesser amounts of the polyoxyethylene surfactants in the preparation of the clear gel product. As in the case of the other ingredients, mixtures of two or more of the polyhydric alcohol surfactants can be employed. Also, the clarity of the gel may be diminished by the removal of the polyhydric alcohol surfactant depending upon the relative quantities of the various ingredients comprising the clear gel.

The clear gel emulsion of the present invention comprises, by weight from about 10% to about 40%, preferably from about 15% to about 30%, and advantageously from about 20% to about 25%, of an ester of a fatty acid and a lower alkanol; from about 20% to 80% and preferably from about 55% to 65% of water; from about 3% to about 15% and preferably from about 5% to about 12%, and advantageously from about 6% to 8% of the alkylolamide; from about 3% to 25% and preferably from about 8% to 12% of the polyoxyethylene surfactant, and from about 1% to 8% and preferably from about 2% to 5% of the polyhydric alcohol surfactant.

The clear gel emulsions of the present invention are prepared by mixing the requisite amounts of lower alcohol ester, polyoxyethylene surfactant, alkylolamide, and polyhydric alcohol surfactant. This mixture is heated to a temperature below about 200° F., and preferably to a temperature in the range of about 160–175° F. Water is also heated to this same temperature and is then slowly added to the mixture of the other ingredients with constant agitation until the gel is cooled to temperatures from about 70° F. to 110° F. When it is desired to incorporate supplemental ingredients into the gel, water soluble (hydrophilic) supplemental ingredients are added to the water portion, and oil soluble (lipophilic) supplemental ingredients are added to the oil surfactant portions prior to mixing and gelling.

The following examples are illustrative of clear gel emulsions falling within the scope of this invention. It will be appreciated that other clear gel compositions can readily be prepared in the light of the guiding principles and teachings provided herein. All parts are by weight. The compositions were prepared by mixing together all the ingredients other than water, heating the mixture to the range of 160–175° F., slowly adding to the stirred mixture water, also at 160–175° F., and continuing the stirring after adding all the water until the compositions had cooled.

EXAMPLE I

A clear gel emulsion was made from 22% isopropyl myristate, 6% lauric-myristic diethanolamide, 5% polyoxyethylene (1) ether of oleyl alcohol, 5% polyoxyethylene (15) ether of cetyl-stearyl alcohol, 4% decaglycerol tetraoleate and 58% water. (The numbers in parentheses following the word "polyoxyethylene" indicate the unmber of —($C_2H_4O$)— groups in the compound named.)

EXAMPLE II

A clear gel emulsion was made from 6% lauric-myristic diethanolamide, 4% decaglycerol tetraoleate, 4% polyoxyethylene (15) ether of cetyl-stearyl alcohol, 25% isopropyl myristate, and 61% water.

EXAMPLE III

A clear gel emulsion was made from 6% lauric diethanolamide, 4% hexaglycerol dioleate, 6% polyoxyethylene (8) stearate, 6% polyoxyethylene (39) stearate, 20% isopropyl myristate, and 58% water.

EXAMPLE IV

A clear gel emulsion was made from 6% lauric-myristic diethanolamide, 4% hexaglycerol dioleate, 4% polyoxyethylene (10) ether of oleyl alcohol, 4% polyoxyethylene (15) ether of cetyl-stearyl alcohol, 20% isopropyl palmitate, and 62% water.

EXAMPLE V

A clear gel emulsion was made from 6% lauric diethanolamide, 3% triglycerol mono-oleate, 10% polyoxyethylene (10) ether of oleyl alcohol, 10% polyoxyethylene (15) ether of cetyl-stearyl alcohol, 10% isopropyl myristate, 10% modified coconut oil and 51% water.

EXAMPLE VI

A clear gel emulsion was made from 6% lauric-myristic diethanolamide, 4% hexaglycerol mono-oleate, 6% polyoxyethylene (10) ether of oleyl alcohol, 6% polyoxyethylene (15) ether of cetyl-stearyl alcohol, 20% isopropyl myristate, and 58% water.

It will be observed from the foregoing examples that clear oil in water gels can be prepared containing essentially water, a lower alcohol ester, and a combination of surfactants. We have found that when using a polyglycerol ester, the small amount (e.g., 2–6%) of unreacted free fatty acid present may be desirable. This is essentially explained by the ability of such fatty acid to react and form a soap with the small amount of unreacted free amine present in the alkylolamide. Thus, for example, if the free fatty acid of the polyglycerol ester is low relative to the free amine, the addition of minor amounts of an acid such as oleic acid will be advantageous.

The consistency of the gels may be altered by changing the ratio of polyoxyethylene surfactants. Thus, increasing the concentration of the polyoxyethylene surfactant containing the greater number of oxyethylene units will produce a heavier gel, whereas decreasing its concentration will have an opposite effect. In some instances the ester of a fatty acid and a monohydric alkanol may be partially replaced with an oil such as rearranged or reconstituted coconut oil.

The clear gels of the present invention are useful in cosmetic preparations, such as hand or cold creams, and are particularly useful as hair grooming preparations. They also may be used in other applications, such as textile finishing agents and petroleum additives.

Having thus described the invention, we claim:

1. A clear gel emulsion composition consisting essentially of from about 10% to about 40% by weight of at least one ester selected from the group having the following generic formula:

$$R_1-\overset{O}{\underset{\|}{C}}-O-R_2$$

wherein $R_1$ is a residue of a fatty acid and contains from about 8 to about 24 carbon atoms, and $R_2$ is a lower alkyl radical having from 1 to about 4 carbon atoms; from about 20% to about 80% of water; from about 3% to about 15% of at least one alkylolamide selected from the group having the following generic formula:

$$R_3-\overset{O}{\underset{\|}{C}}-N\diagup^{R_4}_{R_5}$$

wherein $R_3$ is a residue of a fatty acid and contains from about 8 to 14 carbon atoms, $R_4$ is a member selected from the group consisting of hydrogen and a monohydric alkyl radical having from 1 to 4 carbon atoms, and $R_5$ is a monohydric alkyl radical having from about 1 to about 4 carbon atoms; from about 1% to about 25% of a polyoxyethylene surfactant selected from the class of compounds having the generic formulas of:

$$R_6-O-(C_2H_4O)_nH \quad \text{and} \quad R_6-\overset{O}{\underset{\|}{C}}-O-(C_2H_4O)_nH$$

wherein $R_6$ is an aliphatic radical containing from about 8 to 24 carbon atoms and $n$ is an integer having a value of from about 2 to about 40; and from about 1% to about 8% of a partial oleic acid ester of a polyglycerol.

2. A clear gel emulsion consisting essentially by weight of from about 15% to about 30% of an ester having the following generic formula:

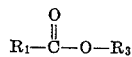

wherein $R_1$ is a residue of a fatty acid and contains from about 11 to about 17 carbon atoms and $R_2$ is a lower alkyl radical containing from 1 to about 4 carbon atoms; from about 40% to 70% of water; from about 5 to about 12% of an alkylolamide having the following generic formula:

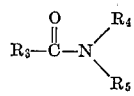

wherein $R_3$ is a residue of a fatty acid containing from about 9 to 13 carbon atoms, $R_4$ is a member selected from the group consisting of hydrogen and a lower alkyl monohydric radical having from 1 to about 4 carbon atoms, and $R_5$ is a lower alkyl monohydric radical having from 1 to about 4 carbon atoms; from about 3% to about 20% of a non-ionic polyoxyethylene surfactant selected from the class of compounds having the generic formulas of:

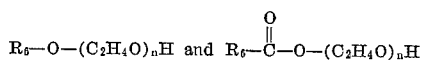

wherein $R_6$ is an alkyl radical containing from about 8 to about 18 carbon atoms and $n$ is an integer having a value of from about 2 to about 30; and from about 2% to 5% of a partial oleic acid ester of a polyglycerol.

3. A clear gel emulsion according to claim 2 wherein said polyoxyethylene surfactant is a mixture wherein $n$ varies from 2 to about 30 for individual members of said mixture, with the average value for $n$, based on the weight of the polyoxyethylene compounds employed, being in the range of from about 10 to about 18.

4. A clear gel emulsion according to claim 2 wherein said partial oleic acid ester of a polyglycerol is decaglycerol tetraoleate.

5. A clear gel emulsion according to claim 2 wherein said polyglycerol ester is hexaglycerol dioleate.

6. A clear gel emulsion according to claim 1 comprising from about 20% to 25% of an isopropyl ester of a fatty acid containing from 12 to 16 carbon atoms; from about 55% to about 65% of water; from about 6% to 8% of an alkylolamide; from about 4% to about 12% of a polyoxyethylene surfactant; and from about 3% to 4% of a partial oleic acid ester of a polyglycerol.

7. A clear gel emulsion according to claim 6 wherein said isopropyl ester is isopropyl myristate.

8. A clear gel emulsion according to claim 6 wherein said alkylolamide is lauric/myristic diethanolamide.

9. A clear gel emulsion according to claim 6 wherein said polyoxyethylene surfactant is a mixture of a polyoxyethylene ether of oleyl alcohol having 10 oxyethylene units and a polyoxyethylene ether of cetyl-stearyl alcohol having 15 oxyethylene units.

10. A clear gel emulsion consisting essentially by weight of about 22% isopropyl myristate; about 58% of water; about 6% of lauric-myristic diethanolamide; about 5% of a polyoxyethylene ether of oleyl alcohol having 10 oxyethylene units and about 5% of a polyoxyethylene ether of cetyl-stearyl alcohol having 15 oxyethylene units, and about 4% hexaglycerol dioleate.

11. A clear transparent gel preparation consisting essentially of, by weight, about 20% of isopropyl myristate; about 58% of water; about 6% of lauric diethanolamide; about 6% of a polyoxyethylene ester of stearic acid having 8 oxyethylene units and about 6% of a polyoxyethylene ester of stearic acid having 39 oxyethylene units; and about 4% of hexaglycerol dioleate.

References Cited
UNITED STATES PATENTS 2,976,251   3/1961   Brokaw et al.   252—316
3,101,300   8/1963   Siegal et al.   167—63

LEON D. ROSDOL, *Primary Examiner.*

J. T. FEDIGAN, *Assistant Examiner.*